United States Patent
Hattori et al.

(10) Patent No.: US 11,634,168 B2
(45) Date of Patent: Apr. 25, 2023

(54) MOTOR INCLUDING CONNECTOR AND CONNECTOR PIN AND ELECTRIC POWER STEERING DEVICE INCLUDING SAME

(71) Applicant: Nidec Corporation, Kyoto (JP)

(72) Inventors: Takashi Hattori, Kyoto (JP); Toshiya Okamoto, Kyoto (JP); Takanobu Oyama, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 462 days.

(21) Appl. No.: 16/637,781

(22) PCT Filed: Jun. 28, 2018

(86) PCT No.: PCT/JP2018/024561
§ 371 (c)(1),
(2) Date: Feb. 10, 2020

(87) PCT Pub. No.: WO2019/064767
PCT Pub. Date: Apr. 4, 2019

(65) Prior Publication Data
US 2020/0172154 A1 Jun. 4, 2020

(30) Foreign Application Priority Data
Sep. 28, 2017 (JP) .............................. JP2017-188422

(51) Int. Cl.
*H02K 5/22* (2006.01)
*H02K 9/22* (2006.01)
(Continued)

(52) U.S. Cl.
CPC ........... *B62D 5/0409* (2013.01); *H02K 5/225* (2013.01); *H02K 9/227* (2021.01); *H02K 11/33* (2016.01)

(58) Field of Classification Search
CPC ............ H02K 5/22; H02K 5/225; H02K 9/22; H02K 9/223; H02K 9/227; H02K 11/30; H02K 11/33; H02K 2211/03
See application file for complete search history.

(56) References Cited

U.S. PATENT DOCUMENTS

2013/0069454 A1    3/2013  Motoda
2013/0313929 A1*  11/2013  Naka ........................ H02K 5/18
                                                                     310/64
(Continued)

FOREIGN PATENT DOCUMENTS

CN           105313951 A       2/2016

OTHER PUBLICATIONS

Official Communication issued in International Patent Application No. PCT/JP2018/024561, dated Sep. 25, 2018.
(Continued)

*Primary Examiner* — Eric Johnson
(74) *Attorney, Agent, or Firm* — Keating & Bennett

(57) ABSTRACT

A motor includes a rotor including an axially extending shaft, a stator, a housing, a heat sink disposed axially above the stator, a board fixed axially above the heat sink, a connector disposed radially outside the housing, and a connector pin accommodated in the connector. The heat sink includes a main body, and a protrusion which is continuous with the main body, the protrusion extending radially outward of the housing. The connector, the protrusion, and the board overlap in this order when viewed from axially below. The connector pin is positioned radially outside the protrusion.

12 Claims, 10 Drawing Sheets

(51) Int. Cl.
*H02K 11/33* (2016.01)
*B62D 5/04* (2006.01)

(56) References Cited

U.S. PATENT DOCUMENTS

| | | | |
|---|---|---|---|
| 2014/0153198 A1* | 6/2014 | Yamasaki | H02K 5/10 |
| | | | 361/747 |
| 2015/0156927 A1* | 6/2015 | Tsuboi | H05K 7/20854 |
| | | | 361/704 |
| 2016/0036289 A1 | 2/2016 | Kawata et al. | |
| 2016/0036303 A1 | 2/2016 | Kadoike et al. | |
| 2020/0195098 A1* | 6/2020 | Shimakawa | B62D 5/0424 |
| 2020/0220435 A1* | 7/2020 | Hattori | H02K 5/225 |

OTHER PUBLICATIONS

Official Communication issued in corresponding Chinese Patent Application No. 201880052514.8, dated Jul. 2, 2021.

\* cited by examiner

MOTOR INCLUDING CONNECTOR AND CONNECTOR PIN AND ELECTRIC POWER STEERING DEVICE INCLUDING SAME

CROSS REFERENCE TO RELATED APPLICATIONS

This is a U.S. national stage of PCT Application No. PCT/JP2018/024561, filed on Jun. 28, 2018, and priority under 35 U.S.C. § 119(a) and 35 U.S.C. § 365 (b) is claimed from Japanese Application No. 2017-188422, filed Sep. 28, 2017; the entire disclosures of each application being hereby incorporated herein by reference.

FIELD OF THE INVENTION

The present disclosure relates to a motor and an electric power steering device.

BACKGROUND

An electromechanically integrated motor in which a motor main body and a control unit that controls the motor main body are integrally disposed is known. The motor main body includes a rotor and a stator. The control unit includes an electronic component and a board.

For example, a conventional motor includes an ECU housing, a control board, a semiconductor module, a heat sink, and a connector. The ECU housing has an opening at one end. The control board is disposed on one end side of the ECU housing. The semiconductor module is electrically connected to the control board. The heat sink is provided inside the ECU housing and has a heat receiving surface that contacts the heat radiating surface of the semiconductor module. The connector is attached and fixed to the ECU housing.

The heat sink described above is accommodated in the ECU housing. In order to ensure the heat dissipation performance, it is necessary to increase the volume of the heat sink. In this case, since it is necessary to enlarge the ECU housing, the motor increases in size.

SUMMARY

A motor according to an example embodiment of the present disclosure includes a rotor including an axially extending shaft, a stator surrounding a radially outer side of the rotor, a housing accommodating the rotor and the stator therein, a heat sink disposed axially above the stator, a board fixed axially above the heat sink, a connector disposed radially outside the housing, and a connector pin accommodated in the connector and electrically connected to the board. The heat sink includes a main body, and a protrusion that is continuous with the main body, the protrusion extending radially outward of the housing. The connector, the protrusion, and the board overlap in this order when viewed from axially below. A connector pin is positioned radially outside the protrusion.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 5b is a modification of FIG. 5a.

FIG. 5c is another modification of FIG. 5a.

DETAILED DESCRIPTION

Figure 1:
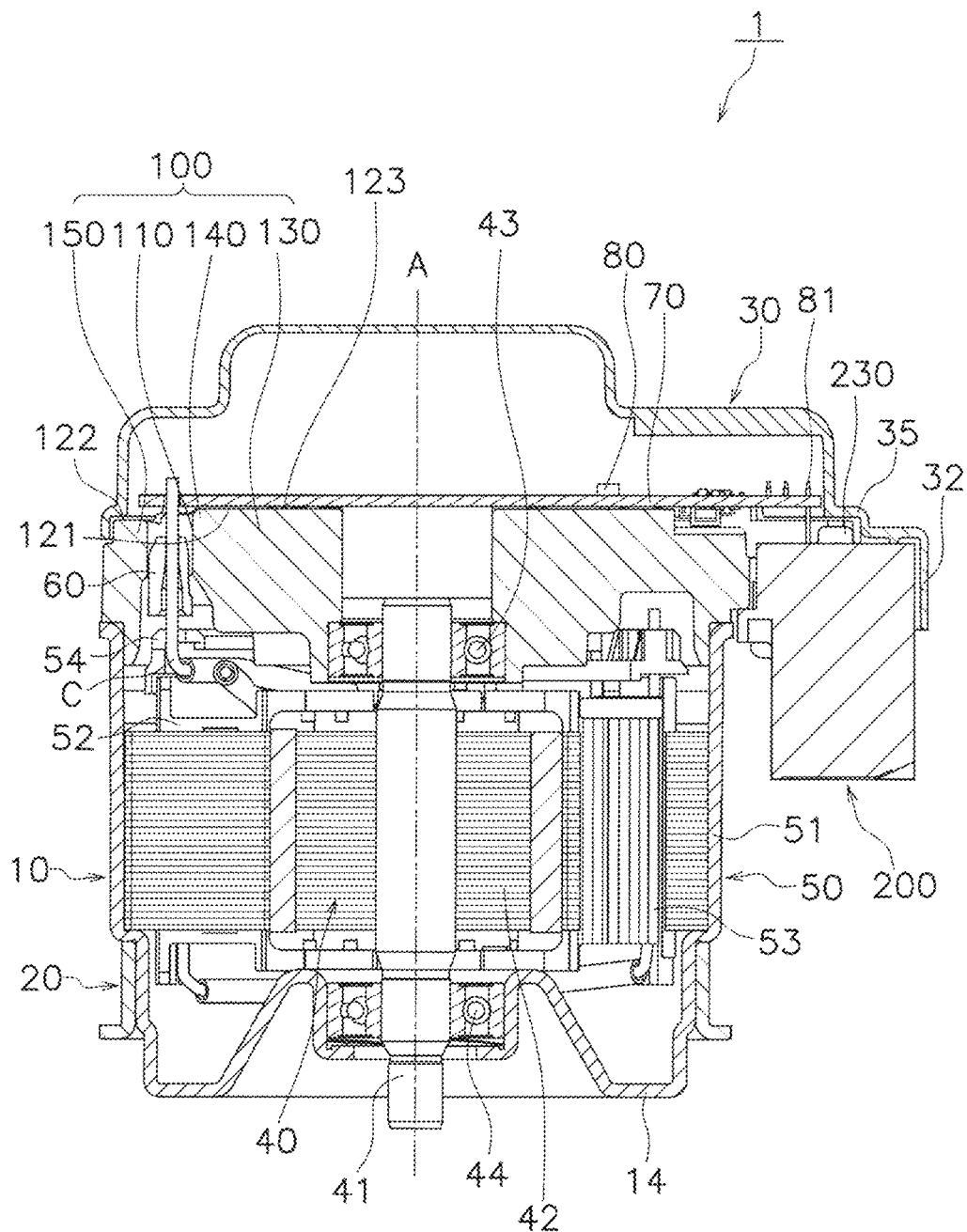
FIG. 1 is a cross-sectional view of a motor according to a first example embodiment of the present disclosure.

Hereinafter, example embodiments of the present disclosure will be described with reference to the drawings. In the following drawings, the same or corresponding parts are denoted by the same reference numerals, and description thereof will not be repeated.

In the following explanation, as shown in FIG. 1, a center axis A of a rotor, that is, an axial direction in which a shaft extends is a vertical direction, and a board side is an upper side, a bottom portion side of a housing is a lower side. However, the vertical direction in this specification is for use in specifying the positional relationship, and does not limit the actual direction. That is, a downward direction does not necessarily mean the direction of gravity.

The direction perpendicular to the center axis A of the rotor is a radial direction, and the radial direction is centered on the center axis A. A circumferential direction is the axis around the center axis A of the rotor.

Furthermore, the description of "axially extending" in the present specification refers to a state of strictly extending in the axial direction and a state of extending in a direction inclined at less than 45 degrees with respect to the axial direction. Similarly, the description of "radially extending" in the present specification refers to a state of strictly extending in the radial direction and a state of extending in a direction inclined at less than 45 degrees with respect to the radial direction.

Further, in this specification, "fitting" means fitting components in fitted shape. The "fitted shape" includes a state where the shape is the same, a state where the shape is similar, and a state where the shapes are different. In the case where the fitted shape is a projection-recess shape, at least part of the projection is positioned in the recess.

In the present specification, a "gap" means a clearance that is intentionally provided. That is, the clearance designed with members not in contact with each other is defined as the gap.

A motor according to an example embodiment of the present disclosure will be described with reference to FIGS. 1 to 10. The motor according to the first example embodiment has a two-system configuration having two sets of U-phase, V-phase, and W-phase.

As shown in FIG. 1, a motor 1 mainly includes a housing 10, a flange 20, a cover 30, a rotor 40, bearings 43 and 44, a stator 50, a coil support member 60, a control unit having a board 70 and an electronic component 80, a heat sink 100, a connector 200, and connector pin 81.

As shown in FIG. 1, the housing 10 accommodates the rotor 40, the stator 50, and the bearings 43 and 44 therein. The housing 10 extends in the axial direction and opens upward. The housing 10 includes a bottom portion 14. The bottom portion 14 closes the housing 10.

The flange 20 is attached to the outer face of the housing 10.

The cover 30 covers at least part of the upper side of the board 70 and the connector 200 in the axial direction.

A rotor 40 includes a shaft 41 and a rotor core 42. The shaft 41 has a substantially cylindrical shape with the center axis A, as the center, extending in the axial direction. The rotor core 42 is fixed to the shaft 41. The rotor core 42 surrounds the radially outer side of the shaft. The rotor core 42 rotates together with the shaft 41.

As shown in FIG. 1, the bearings 43 and 44 support the shaft 41 in a rotatable manner. The bearing 43 disposed on the axially upper side is positioned axially above the stator 50 and is held by the heat sink 100. The bearing 44 disposed on the axially lower side is held by the bottom portion 14 of the housing 10.

The stator 50 surrounds the radially outer side of the rotor 40. Stator 50 includes a stator core 51, an insulator 52, a coil 53, a bus bar (not shown), and a bus bar holding member 54.

The stator core 51 includes a plurality of core backs and teeth disposed in the circumferential direction. The core back has a cylindrical shape concentric with the center axis A. The teeth extend radially inward from the inner face of the core back. A plurality of teeth is provided, extends in the radial direction from the core back, and is disposed with a gap (slot) therebetween in the circumferential direction.

The insulator 52 covers at least part of the stator core 51. The insulator 52 is formed of an insulator and is attached to each tooth.

The coil 53 excites the stator core 51 and is configured by winding a coil wire C. Specifically, the coil wire C is wound around each tooth via the insulator 52, and the coil 53 is disposed on each tooth. That is, the coil wire C is concentrically wound. In the present example embodiment, the coil wire C is wound around each of two different teeth in a concentrated manner, so-called two teeth in winding. The coil wire C is positioned radially inside relative to the radially outer end of the bus bar holding member 54.

One end of the coil wire C is connected to the bus bar. The other end of the coil wire C is inserted into the coil support member 60 described later and connected to the board 70. The other end of the coil wire C of the present example embodiment is a conducting wire drawn out of the coil 53, and, specifically, six lead wires 53U1, 53U2, 53V1, 53V2, 53W1, and 53W2 (see FIG. 6) constituting each of the U phase, the V phase, and the W phase in the first and second systems. The lead wires 53U1, 53U2, 53V1, 53V2, 53W1, and 53W2 drawn from the stator 50 are inserted into a through hole 65 of the coil support member 60 described later and a heat sink through hole 110 (see FIG. 3), and are electrically connected to the control unit by a method such as soldering.

The lead wires 53U1, 53U2, 53V1, 53V2, 53W1, and 53W2 are collected in a region of 180 degrees or less around the shaft by the crossover wire.

When the motor 1 is driven, the current is passed through the lead wires 53U1, 53V1, and 53W1 constituting the layers of the U phase, the V phase, and the W phase in the first system, and the current is also passed through the lead wires 53U2, 53V2, and 53W2 constituting U-phase, V-phase, and W-phase phases in the second system. With this configuration, for example, even when the electricity to the coil to one system is stopped due to an inverter failure, etc. when the motor 1 is driven, since the coil in the other system can be energized, so that the motor 1 can be driven.

Although the motor 1 in the present example embodiment has a two-system configuration including two sets of U-phase, V-phase, and W-phase, the number of systems can be arbitrarily designed. That is, the motor 1 may have a single system, or three or more systems.

The bus bar B is a member formed of a conductive material that electrically connects the coil wires led out from the coil 53 to each other. The bus bar B in the present example embodiment is a neutral point bus bar in star connection.

The bus bar holding member 54 shown in FIG. 1 holds the bus bar. The bus bar holding member 54 is made of an insulating material. The bus bar holding member 54 is fixed to the radially outer side of the insulator 52 or the axially upper side of the core back. The bus bar holding member 54 and the bearing 43 overlap in the radial direction.

The coil support member 60 supports a conductive member such as the coil wire C. The coil support member 60 is made of an insulating material. The coil support member 60 is disposed axially above the stator 50, and the coil wire C is inserted therethrough.

The control unit controls the motor main body having the rotor 40 and the stator 50. The control unit includes a board 70 and an electronic component 80 mounted on the board 70. The board 70 is disposed axially above the stator 50 so as to spread in the radial direction, and is fixed to the axially upper side of the heat sink 100. The electronic component 80 is mounted on at least one of the upper face and the lower face of the board 70.

Figure 10:
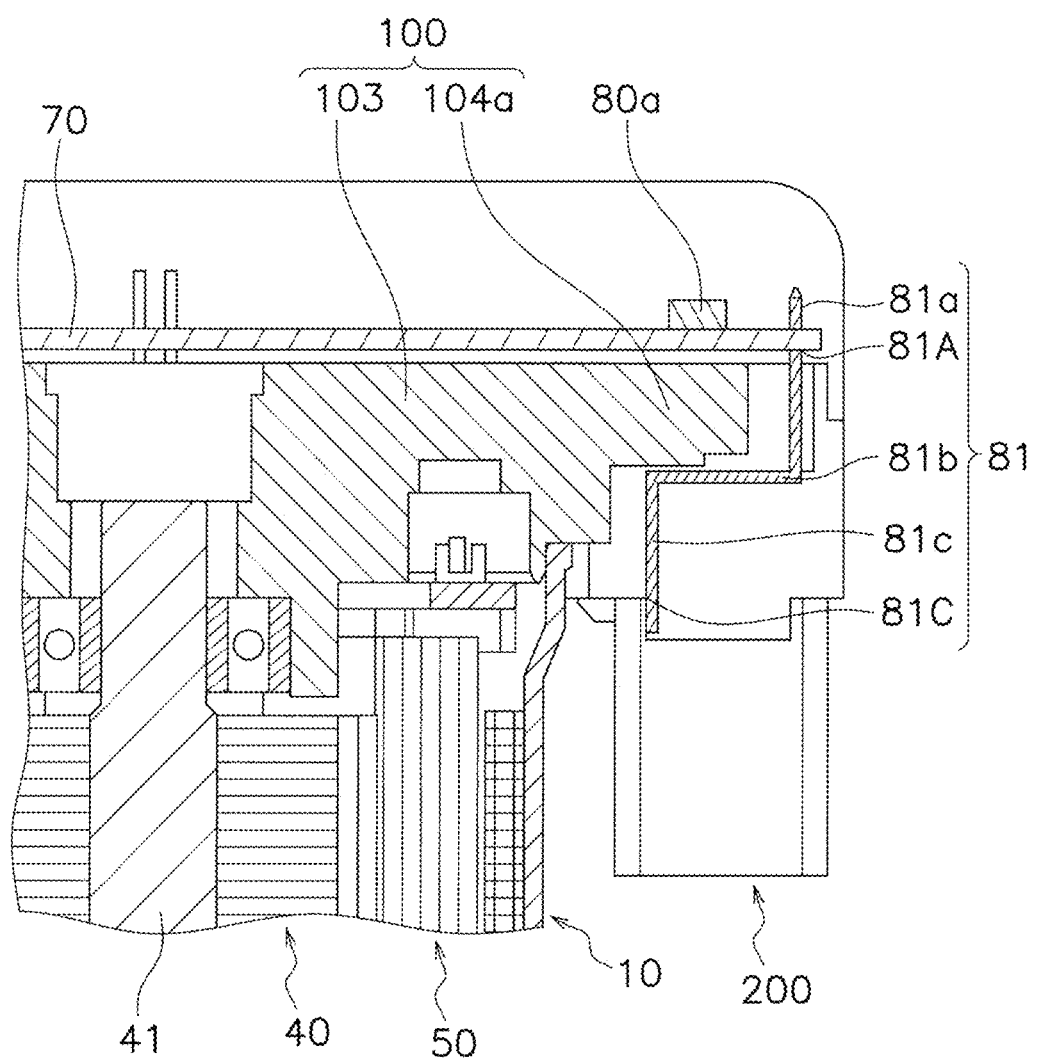
FIG. 10 is an enlarged cross-sectional view of the vicinity of a protrusion of the heat sink in the first example embodiment of the present disclosure.

As shown in FIG. 10, a choke coil 80a can be used as one of the electronic components 80 mounted on the board 70. The choke coil 80a is electrically connected to the board 70. The choke coil 80a removes noise.

Figure 2:
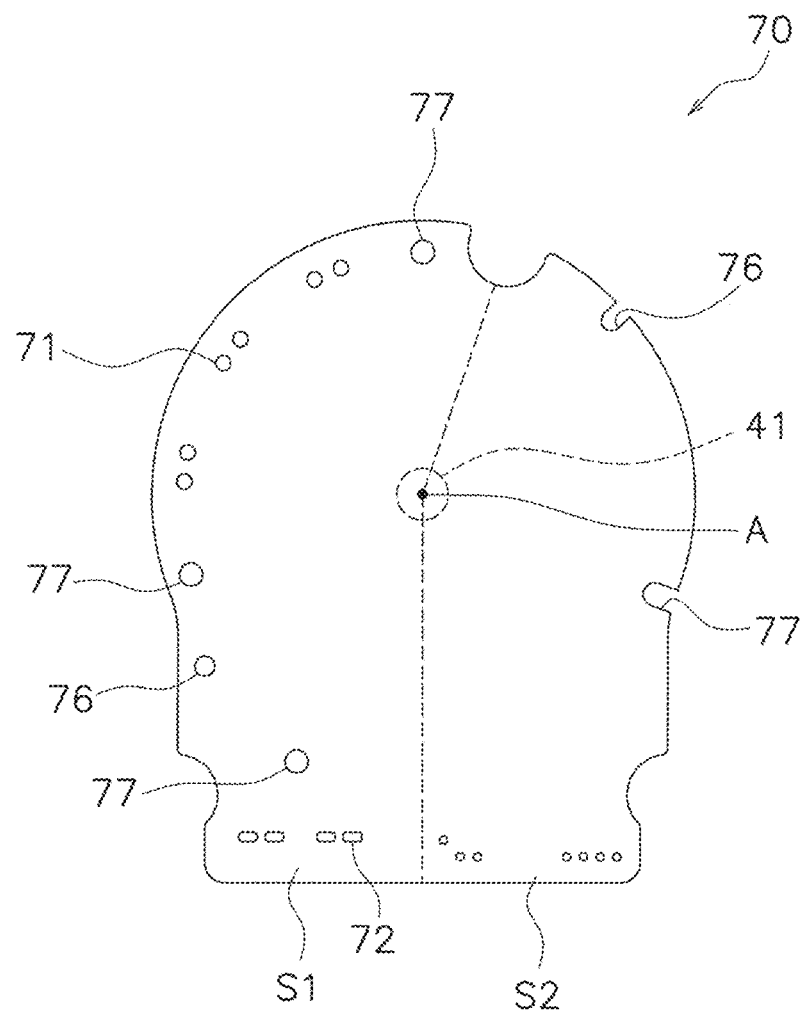
FIG. 2 is a bottom view of a board according to the first example embodiment of the present disclosure.

As shown in FIG. 2, the board 70 has a first region S1 in which the power element is mounted and a second region S2 in which the control element is mounted. The first region S1 is a region of 180 degrees or more around the center axis A of the shaft 41 when viewed from the upper side in the axial direction.

Here, when the power element and the control element are separately disposed in the circumferential direction on the board 70, the first region S1 and the second region S2 can be defined. Therefore, this is not the case when the power element and the control element are scattered irregularly on the board 70, and when the power element and the control element are disposed separately in the same circumferential direction and in the same radial direction.

The first region S1 and the second region S2 are regions defined by an angle with the shaft 41 (the center axis A) as the center. For example, even when the power element is unevenly disposed radially inside of the board 70 in the first region S1, the radially outer side of the board 70 is regarded as the first region S1.

Here, the power element is an element, on the circuit, that connects the coil wire to the external power supply, and the control element is an element, on the circuit, that connects a signal line detected by a magnetic sensor to an external control device. Examples of the power element include a choke coil 80a, an FET, and a capacitor. Examples of the control element include a microcomputer and the like.

As shown in FIG. 2, the board 70 has board through holes 71 and 72 through which the conductive member passes. The conductive member is a member that is connected to the board 70 and distributes power, such as a connector pin 81 shown in FIG. 1, the coil wire C wound around the stator 50, and the like. In the present example embodiment, the coil wire is inserted into the board through hole 71, and the connector pin 81 is inserted into the board through hole 72. The coil wire C and the board 70, and the connector pin 81 and the board 70 are fixed by solder connection.

The board 70 includes, for positioning with the heat sink 100, a positioning hole portion 76 corresponding to a second positioning recess 176 (see FIG. 3) of the heat sink 100. The positioning hole portion 76 is a round hole, a cutout hole, or the like.

In addition, the board 70 includes, for fixing with the heat sink 100, a fixing hole 77 corresponding to a fixing hole 177 (see FIG. 3) of a heat sink main body 103. The fixing hole 77 is a round hole, a cutout hole, or the like.

Figure 3:
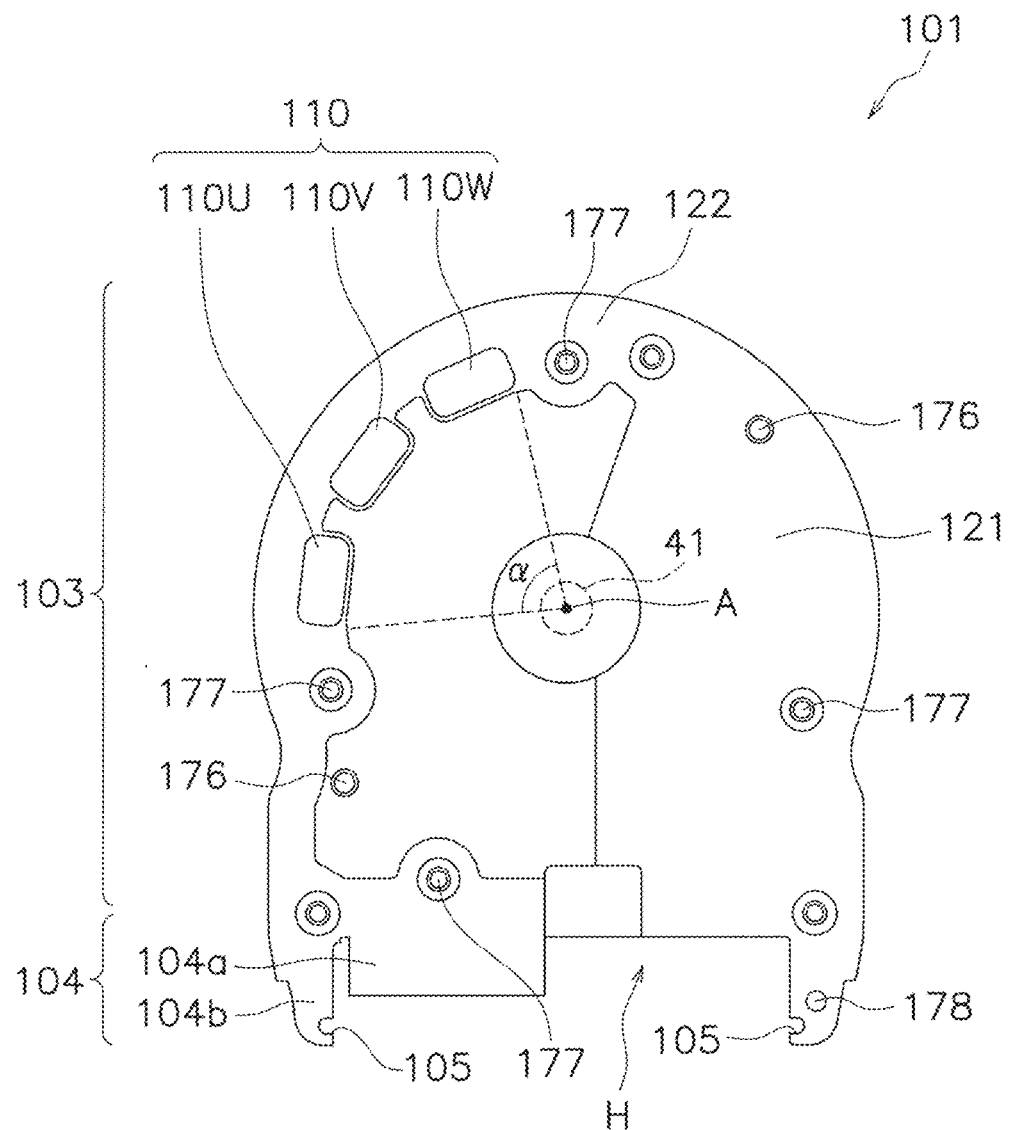
FIG. 3 is a plan view of a heat sink according to the first example embodiment of the present disclosure.

A first positioning hole 178 shown in FIG. 3 passes through a heat sink upper face 101 and a heat sink lower face 102. When the heat sink upper face 101 is processed, the second positioning recess 176 is formed using the first positioning hole 178 as a reference. Similarly, when the heat sink lower face 102 is processed, a first positioning recess 179 is formed using the first positioning hole 178 as a reference. As a result, the positions of the first positioning recess 179 and the second positioning recess 176 are determined based on the first positioning hole 178.

Therefore, the positions of the connector 200 positioned by the first positioning recess 179 and the board 70 positioned by the second positioning recess 176 are determined. As a result, the connector pin 81 can be easily connected without causing a positional shift between the heat sink 100 and the connector 200.

The board 70 or the electronic component 80 and the conductive members such as the board 70 and the coil wire C are connected by a connection member. The connection member is a conductive adhesive, solder, or the like, and the solder is used in the present example embodiment. The solder is disposed so as to be continuous with the upper and lower faces of the board 70 and the inside of the board through hole 71 for allowing the conductive member to pass therethrough. All of the solder is positioned axially above an exposed face 122 (see FIG. 1) of the heat sink 100 described later.

As shown in FIG. 1, the heat sink 100 is disposed axially above the stator 50 and faces the board 70 in the axial direction.

The heat sink 100 has a function of absorbing heat from the electronic component 80 mounted on the board 70 and releasing it to the outside, and is formed of a material having low thermal resistance.

Since the heat sink 100 holds the bearing 43, it is also used as a bearing holder. In the present example embodiment, since the bearing holder and the heat sink are integrated, the number of parts, the number of assembly points, and the costs associated therewith can be reduced. In addition, since heat resistance generated when the bearing holder and the heat sink are separated can be suppressed, heat can be easily transmitted to the outside.

Figure 4:
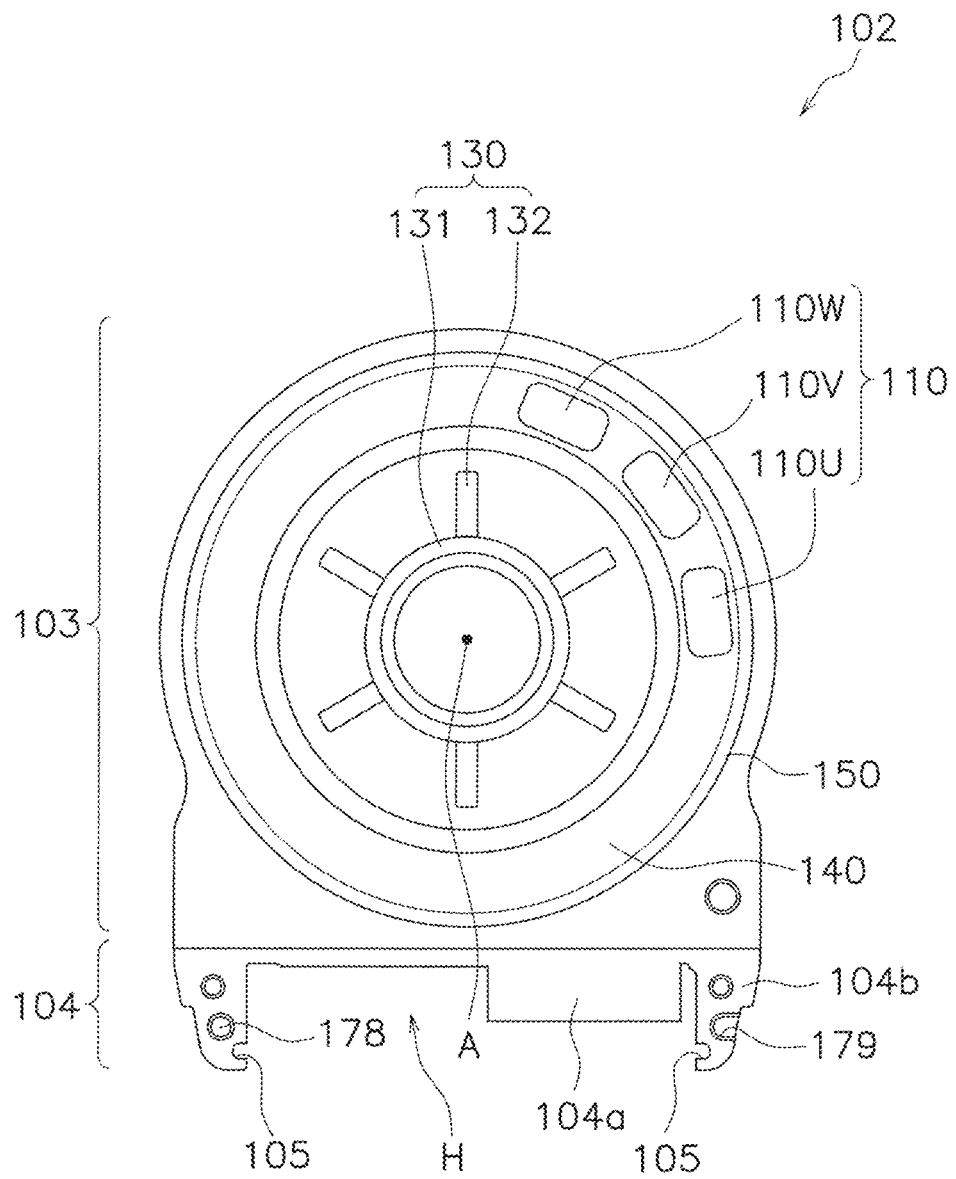
FIG. 4 is a bottom view of the heat sink according to the first example embodiment of the present disclosure.

The heat sink 100 has the heat sink upper face 101 shown in FIG. 3 and the heat sink lower face 102 shown in FIG. 4.

The heat sink upper face 101 faces the board 70, and the heat sink lower face 102 faces the stator 50.

As shown in FIGS. 3 and 4, the heat sink 100 includes the heat sink main body 103 and a heat sink protrusion 104 continuous with the heat sink main body 103 and extending radially outward of the housing 10.

The heat sink main body 103 overlaps the housing 10 that accommodates the rotor 40 and the stator 50 when viewed from the upper side in the axial direction. The heat sink protrusion 104 protrudes from the heat sink main body 103 in the radial direction, and covers at least part of the connector 200 in the longitudinal direction (the left-right direction in FIGS. 3 and 4).

The heat sink protrusion 104 includes a first protrusion 104a and a second protrusion 104b. As shown in FIG. 10, the connector pin 81 is positioned radially outside the first protrusion 104a. The connector pin 81 is not located radially outside the second protrusion 104b.

Figure 5A:
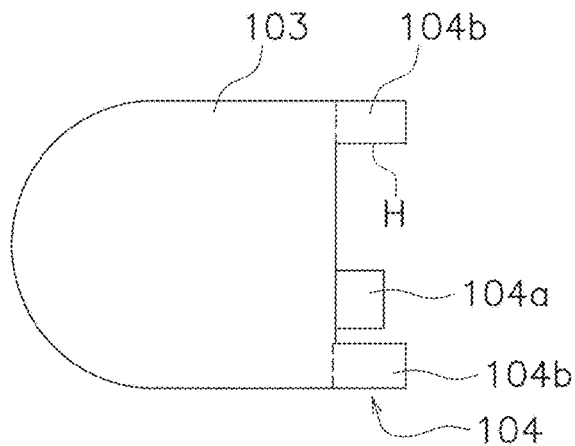
FIG. 5a is a plan view schematically showing FIG. 3.

The shape of the heat sink protrusion 104 is a shape in which a plurality of rod members protrudes in a plan view as shown in FIG. 5a. In the structure of FIG. 5a, the first protrusion 104a is disposed between the second protrusions 104b. The first protrusion 104a may extend inward from the radially outer end of the second protrusion 104b.

Figure 5B:
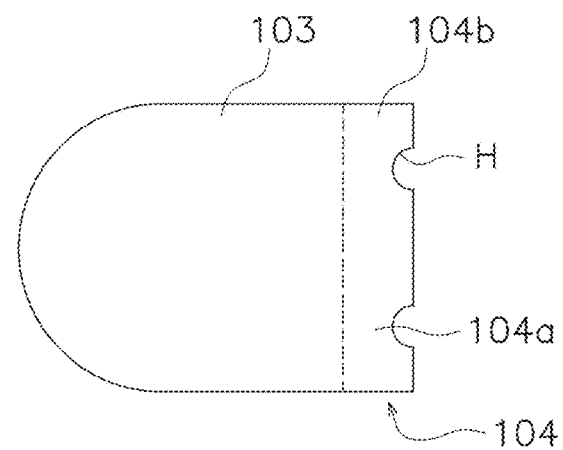
Figure 5C:
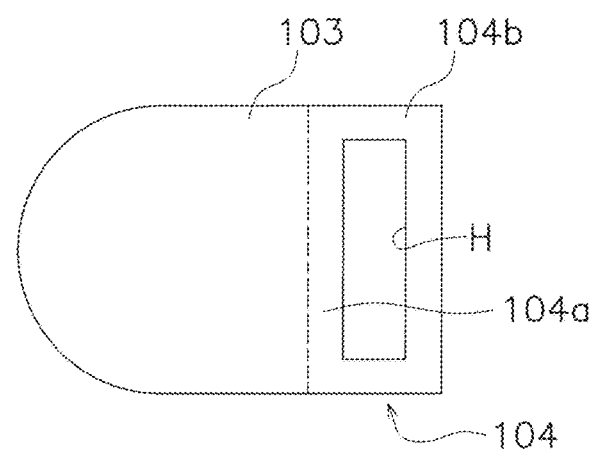

Further, the shape of the heat sink protrusion 104 may be a plate-like shape as shown in FIG. 5b, a ring shape as shown in FIG. 5c, or the like. In the structure of FIGS. 5b and 5c, the first protrusion 104a and the second protrusion 104b are integrated.

As shown in FIG. 10, the first protrusion 104a is disposed in a space provided between the connector 200 and the board 70 by positioning the connector pin 81 radially outside.

When viewed from axially below, the connector 200, the first protrusion 104a, and the board 70 overlap in this order. That is, the first protrusion 104a is sandwiched between the board 70 and the connector 200. This order represents the position of the lower end of each member when the members overlap each other. That is, when viewed from axially below, the lower end of the connector 200, the lower end of the first protrusion 104a, and the lower end of the board 70 are positioned in this order.

Further, when viewed from axially below, the connector 200, the first protrusion 104a, the board 70, and the choke coil 80a overlap in this order. That is, when viewed from axially below, the lower end of the connector 200, the lower end of the first protrusion 104a, the lower end of the board 70, and the lower end of the choke coil 80a are positioned in this order.

Further, when viewed from axially below, the connector 200, the connector pin 81, the first protrusion 104a, and the board 70 overlap in this order. That is, when viewed from axially below, the lower end of the connector 200, the lower end of the connector pin 81, the lower end of the first protrusion 104a, and the lower end of the board 70 are positioned in this order.

A clearance is provided between the first protrusion 104a and the connector 200 in the axial direction. The lower face of the first protrusion 104a has a step. At least part of the lower face of the first protrusion 104a is disposed at a distance from other members. That is, at least part of the lower face of the first protrusion 104a does not come into contact with other members. In FIG. 10, the connector pin 81 is positioned between the first protrusion 104a and the connector 200.

In the present example embodiment, the lower face of the first protrusion 104a is positioned axially above the lower face of the second protrusion 104b. The lower face of the first protrusion 104*a* is positioned axially above the lower face of the heat sink main body 103.

A plurality of second protrusions 104*b* shown in FIGS. 3 and 4 is formed at intervals. Specifically, the second protrusion 104*b* protrudes from one end and the other end (the upper end and the lower end in FIG. 5*a*) of the radially outer end edge (the right end of the heat sink main body 103 in FIG. 5*a*) of the heat sink main body 103 on the connector 200 side.

Here, the shape of the second protrusion 104*b* is a shape protruding in a rod shape in plan view as shown in FIGS. 3, 4, and 5*a*, and when installed only at both ends, the second protrusion 104*b* together with the heat sink main body 103 forms a substantially U shape. In addition, when the second protrusion 104*b* has a shape protruding in a rod shape in plan view, one second protrusion 104*b* may be provided, or three or more second protrusions 104*b* may be provided, and it does not need to be provided at both ends.

The second protrusion 104*b* has a heat sink recess or a heat sink projection extending in the axial direction so as to be fitted to the connector 200 described later. Further, the heat sink recess or the heat sink projection extends along the axial direction. In FIGS. 3 and 4, a heat sink recess 105 is formed on each of the inner faces of the second protrusion 104*b* located at one end and the other end of the connector 200 in the longitudinal direction. The inner face of the second protrusion 104*b* is a face facing the connector 200.

In the present example embodiment, the second protrusion 104*b* is the exposed face 122 (see FIG. 1). That is, a clearance is provided between the second protrusion 104*b* and the board 70. Therefore, it is possible to visually check whether the connector pin 81 is connected to the board 70 from the longitudinal direction of the connector 200 in the previous process of attaching the cover 30.

The second protrusion 104*b* of the present example embodiment overlaps the connector 200 when viewed from axially below, but does not overlap with the board 70. Note that the second protrusion 104*b* may overlap with the board 70 when viewed from axially below.

The heat sink 100 has a hollow portion H through which the conductive member passes and that extends in the axial direction. The hollow portion H is a through hole, a cutout or the like.

When the conductive member is the connector pin 81 or the like, in the structure shown in FIGS. 3 and 4, and FIG. 5*a* schematically showing these, the hollow portion H through which the conductive member passes has the heat sink main body 103 and the heat sink protrusion 104. Specifically, the hollow portion H is formed by a radially outer end edge of the heat sink main body 103 on the connector side, the first protrusion 104*a*, and the second protrusion 104*b*.

In the structure having a cutout at the radially outer end of the heat sink protrusion 104 shown in FIG. 5*b* of the modification, the cutout forms the hollow portion H. In the structure in which the heat sink protrusion 104 shown in FIG. 5*c* of another modification has a ring shape, a hollow hole having a ring shape forms the hollow portion H.

When the conductive member is a coil wire from the stator 50, as shown in FIGS. 3 and 4, the heat sink through hole 110 through which the coil wire passes and that extends in the axial direction is formed as the hollow portion H.

In this way, the hollow portion H of the heat sink 100 shown in FIGS. 3 and 4 has the radially outer end face of the heat sink main body 103, the outer end face of the first protrusion 104*a*, and the inner end face of the second protrusion 104*b*. The hollow portion H is a cavity for the conductive member from the connector and the heat sink through hole 110 for the coil wire.

Figure 6:
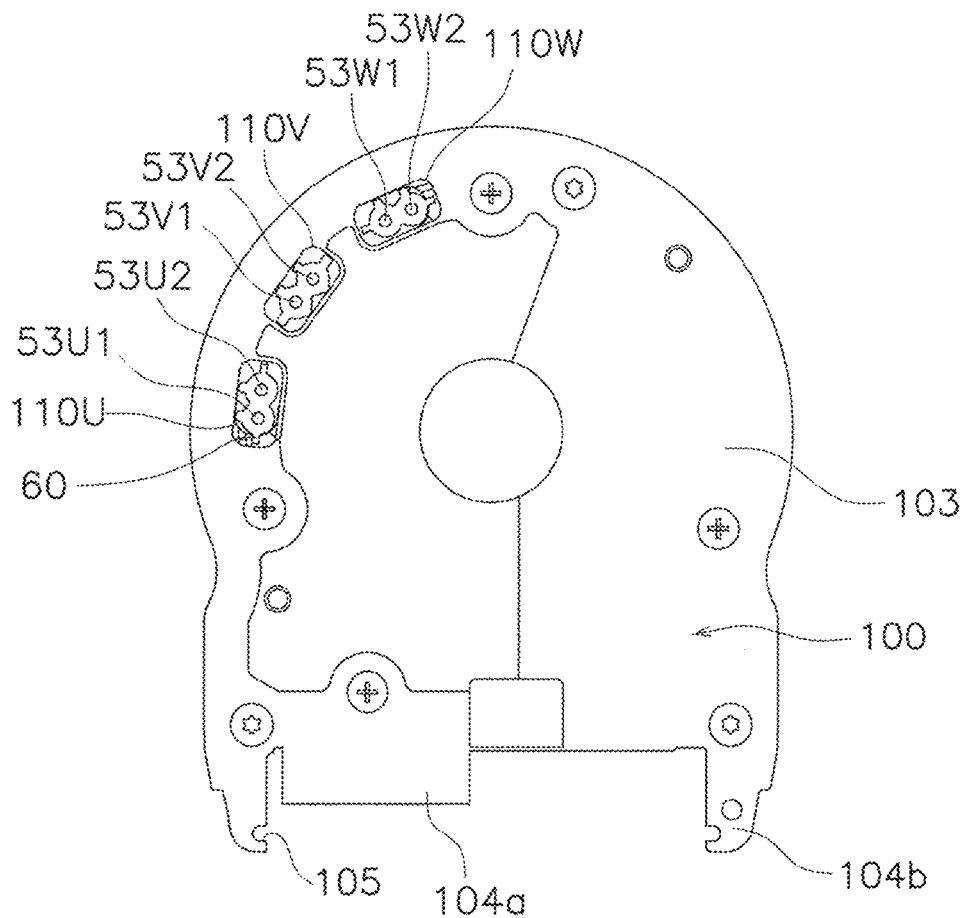
FIG. 6 is a plan view of a coil support member that supports a coil wire and the heat sink according to the first example embodiment of the present disclosure.

As shown in FIGS. 3, 4, and 6, the heat sink through hole 110, through which a conductive member such as a coil wire passes, extends in the axial direction. For this reason, the heat sink through hole 110 can position the conductive member. As shown in FIGS. 1 and 6, the heat sink through hole 110 of the present example embodiment holds the coil support member 60 that supports the coil wire.

A plurality of heat sink through holes 110 is located adjacent to each other in the circumferential direction. Specifically, a plurality of heat sink through holes 110U, 110V, and 110W is provided at intervals in the circumferential direction. That is, the plurality of heat sink through holes 110U, 110V, and 110W is aligned on a concentric arc at intervals.

As shown in FIG. 3, when the heat sink through holes 110U, 110V, and 110W are located in a region within 180 degrees with the central angle α centering on the shaft 41 (the center axis A) when viewed from the upper side in the axial direction. That is, the heat sink through holes 110U, 110V, and 110W are collected and disposed on one side. It is preferable that the number of slots be 6 or more, the number of phases is 3, and the central angle α be "(360 degrees/the number of slots)×3" degrees or less.

The "phase" in the above formula is the number of independent coils of the fixed stator, and a three-phase motor with three phases is a motor with three independent coils at intervals of 120 degrees. In the present example embodiment, it is a three-phase motor of U-phase, V-phase and W-phase. In addition, the "slot" in the above formula represents the number of grooves between teeth, which is a multiple of 3 for the three-phase motor. In the present example embodiment, since the motor has 12 slots of 3 phases, the central angle α is preferably 90 degrees or less.

Similarly to the heat sink through holes 110U, 110V, and 110W, the coil lead wires 53U1, 53U2, 53V1, 53V2, 53W1, and 53W2 are desirably disposed so as to be located within the central angle α. By using the crossover wire, the coil lead wire can be located within the central angle α.

As shown in FIG. 6, only a plurality of in-phase coil wires of the coil wires is inserted into each of the plurality of heat sink through holes 110U, 110V, and 110W. The plurality of heat sink through holes 110U, 110V, and 110W is holes separated from each other for each phase of the coil wire. That is, the plurality of heat sink through holes 110U, 110V, and 110W is independent from each other and are not connected. Specifically, only the lead wires 53U1 and 53U2, which are two U-phase coils, are inserted into the heat sink through hole 110U. Only the lead wires 53V1 and 53V2, which are two V-phase coils, are inserted into the heat sink through hole 110V. Only the lead wires 53W1 and 53W2, which are two W-phase coils, are inserted into the heat sink through hole 110W.

When viewed from the upper side in the axial direction, the heat sink through holes 110U, 110V, and 110W face the first region S1 in which the power element is mounted on the board 70. For this reason, the heat sink through holes 110U, 110V, and 110W through which the coil wires pass are formed in the first region S1 where the power element of the board 70 is mounted.

When viewed from the upper side in the axial direction, the heat sink through holes 110U, 110V, and 110W may have a structure extending over the first region S1 where the power element is mounted and the second region S2 where the control element is mounted. Further, when viewed from the upper side in the axial direction, a structure in which part of the heat sink through hole is the first region S1 and the remaining part is the second region S2 may be provided.

As shown in FIG. 1, at least part of the coil support member 60 is positioned in the heat sink through hole 110. As shown in FIGS. 1, the clearance between the coil support member 60 and the heat sink through hole 110 is smaller or constant as it goes downward.

Specifically, the width of the upper end of the coil support member 60 is smaller than the width of the lower end of the heat sink through hole 110, and the width of the coil support member 60 is constant or gradually larger from the upper side toward the lower side in the axial direction. More specifically, the heat sink through hole 110 has a constant width, and the side face of the coil support member 60 has a tapered shape that expands downward.

In addition, as another construction, the width of the lower end of the heat sink through hole 110 is larger than the width of the upper end of the coil support member 60, and the width of the heat sink through hole 110 has a portion which is constant or gradually smaller from the lower side toward the upper side in the axial direction. More specifically, the heat sink through hole 110 has a tapered shape that expands downward, and the side face of the coil support member 60 has a constant width.

Although the width of the upper end of the heat sink through hole 110 may be larger than the width of the coil support member 60, the width of the upper end of the heat sink through hole 110 may be smaller than the width of the coil support member 60.

In this way, since the clearance between the coil support member 60 and the heat sink through hole 110 is constant or larger as it goes from the lower side to the upper side, when the motor 1 is assembled, the heat sink through hole 110 can be easily inserted from above the coil support member 60.

As shown in FIG. 1, the heat sink 100 has a contact face 121 and the exposed face 122. The contact face 121 and the exposed face 122 are faces located on the upper face of the heat sink 100 shown in FIG. 3.

The contact face 121 comes into contact with the board 70 or the electronic component 80 directly or through a heat dissipation member 123. The heat dissipation member 123 is a member having the heat dissipation performance such as grease. The heat dissipation member 123 comes into contact with the heat sink 100 and the board 70. The exposed face 122 is exposed without coming into contact with the board 70, the electronic component 80, and the heat dissipation member. In other words, the exposed face 122 is disposed with a clearance from the board 70 or the electronic component 80. That is, the contact face 121 comes into direct or indirect contact with the board 70 or the electronic component 80, and the exposed face 122 comes into direct or indirect contact with no member.

As shown in FIG. 3, the exposed face 122 is positioned edge side with respect to the hollow portion H (the heat sink through hole 110 in FIG. 3). In the present example embodiment, since the plurality of heat sink through holes 110 is provided along the circumferential direction, the exposed face 122 is positioned radially outside relative to the heat sink through holes 110. The boundary between the contact face 121 and the exposed face 122 is positioned in the circumferential direction. In FIG. 3, the boundary between the contact face 121 and the exposed face 122 is positioned on a circular arc with a central angle α obtained by connecting the heat sink through hole 110U located at one end, the heat sink through hole 110W located at the other end, and the center axis A.

Since a clearance is formed between the board 70 and the electronic component 80, and the heat sink 100 by the exposed face 122, the connection of the board 70 or the electronic component 80 and the conductive member can be visually checked. When the connection is checked from the upper face of the board 70, since the connection, by the connection member, of the inside of the board through hole 71 and the lower face of the board 70 is unknown, it is preferable to check the connection from the lower face side of the board 70.

In the heat sink 100 shown in FIG. 1, the exposed face 122 is positioned axially below the contact face 121. The board 70 may have a plate shape that extends flatly, and the exposed face 122 may be located below the contact face 121. Further, the board 70 may have a step structure, and the exposed face 122 and the contact face 121 may be located on the same plane.

The contact face 121 may have a first contact face that comes into direct contact with the board 70 or the electronic component 80, and a second contact face that comes into contact with the board 70 or the electronic component 80 via the heat dissipation member 123.

In order to check the shape of the lower end (back fillet) of the connection member that connects the electronic component 80 or the board 70 and the conductive member, it is preferable that the clearance between the board 70 or the electronic component 80 and the exposed face 122 be larger than the clearance between the board 70 or the electronic component 80 and the second contact face. In addition, the clearance is thin due to the grease applied to the second contact face, and the connection member is disposed into the exposed face 122, so that it is difficult to see. From the viewpoint of suppressing such a problem, it is preferable to increase the clearance between the board 70 or the electronic component 80 and the exposed face 122. In addition, when the coil support member 60 is displaced upward, it is difficult to see the lower end of the connection member, so that it is preferable to have a sufficient clearance.

As shown in FIG. 1, when the distal end of the member that supports the conductive member (the coil support member 60 in the present example embodiment) is positioned at a height the same as or below a height of the exposed face in the axial direction, the lower end of the connection member can be checked more easily. On the other hand, when the distal end of the member that supports the conductive member is positioned at a height the same as or above a height of the exposed face 122 in the axial direction, it is possible to further prevent the connection member connecting the board 70 or the electronic component 80 and the conductive member from being conducted to the heat sink 100.

As shown in FIG. 1, the heat sink 100 includes an inner region 130, an outer region 140 located radially outside relative to the inner region 130, and an outer wall portion 150 formed radially outside relative to the outer region 140.

The inner region 130 at least partially overlaps the electronic component 80 in the axial direction. The axial thickness of the inner region 130 is larger than the axial thickness of the outer region 140.

In the present example embodiment, since the heat sink through holes 110U, 110V, and 110W are located in the radially outer region of the board 70, the board 70 has electronic components densely arranged in the radially inner region thereof. Therefore, the heat of the electronic components can be released to the heat sink 100 by increasing the axial thickness of the inner region 130 of the heat sink 100. Furthermore, a space for accommodating the components can be secured by reducing the thickness of the outer region 140. Therefore, it is possible to more effectively dissipate heat from the electronic component and to suppress the axial size.

As shown in FIG. 4, the inner region 130 has an inner wall portion 131 and a rib 132. The inner wall portion 131 and the rib 132 are formed on the heat sink lower face 102. The inner wall portion 131 extends axially downward at the radially inner end. The rib 132 extends radially outward from the inner wall portion 131. A plurality of ribs 132 is provided, and each of the plurality of ribs 132 is disposed at equal intervals in the circumferential direction. The plurality of ribs 132 extends radially in the radial direction with the center axis A as the center. Since the inner wall portion 131 and the rib 132 can increase the rigidity of the inner region 130 of the heat sink 100, the durability against the stress for supporting the shaft 41 can be improved when the heat sink 100 holds the bearing 43. Further, by extending the rib 132 in the radial direction, the heat capacity of the heat sink 100 can be increased and heat can be easily transferred radially outward.

The outer region 140 has the heat sink through holes 110U, 110V, and 110W through which the coil wire C described above is inserted. The lower face of the outer region 140 is positioned axially above the lower face of the inner region 130.

As shown in FIG. 1, the bus bar holding member 54 is positioned below the outer region 140 in the axial direction and overlaps the inner region 130 in the radial direction. In other words, a recess that is recessed in the axially upward is provided on the radially outer side and the lower face of the heat sink 100, and the bus bar B is accommodated in this recess.

In the present example embodiment, a large number of heat generating elements (elements having a relatively large amount of heat generation, such as FETs) are disposed in the center portion (radially inside) of the board 70. For this reason, the heat dissipation effect is enhanced by increasing the thickness of the inner region 130 located at the center of the heat sink 100 facing the board 70.

On the other hand, the coil wire C drawn from the coil 53 of the stator 50 is connected to the outer side (radially outer side) of the board 70, and no heat generating element is disposed. The bus bar holding member 54 is disposed with the thickness of the outer region 140 reduced, the height in the axial direction can be suppressed. Further, the heat sink 100 covers the upper face and the side face of the bus bar, so that the heat sink 100 can absorb the radiant heat of the bus bar during driving.

The outer wall portion 150 surrounds the radially outer side of the bus bar holding member 54. The axial thickness of the outer wall portion 150 is larger than the axial thickness of the inner region 130. At least part of the outer wall portion 150 is exposed to the outside. Since the outer wall portion 150 includes a portion having the largest axial thickness in the heat sink 100, the heat dissipation effect can be further enhanced.

As shown in FIG. 3, the heat sink upper face 101 of the heat sink main body 103 has the second positioning recess 176 for positioning with the board 70. A plurality of second positioning recesses 176 is formed as circular recesses. A positioning member such as a positioning pin is inserted into the second positioning recess 176 of the heat sink 100 and the positioning hole portion 76 (see FIG. 2) of the board 70 for positioning.

The heat sink main body 103 has the fixing hole 177 for fixing of the board 70. The fixing hole 177 is a board contact portion that contacts the board 70 in the axial direction. A plurality of fixing holes 177 is formed as circular holes. A fixing member such as a fixing pin or a screw is inserted into the fixing hole 177 of the heat sink 100 and the fixing hole 77 of the board (see FIG. 2), and the board 70 and the heat sink 100 are fixed.

As described above, the positions of the heat sink 100 and the board 70 are determined using the positioning member, and are fixed by the fixing member. After the board 70 and the heat sink 100 are fixed, the positioning member is removed.

Since the heat sink 100 and the board 70 are brought into contact with each other, the fixing hole 177 protrudes axially upward with respect to the exposed face 122. That is, in the present example embodiment, the fixing hole 177 is positioned on the first contact face.

As shown in FIG. 3, the plurality of heat sink through holes 110 and the fixing holes 177 are provided at intervals in the circumferential direction. The two fixing holes 177 are provided at intervals in the circumferential direction with respect to the heat sink through holes 110U and 110W located at both ends in the circumferential direction among the plurality of heat sink through holes 110.

As shown in FIG. 4, the second protrusion 104b has the first positioning hole 178, and the first positioning recess 179 or a first positioning projection (not shown) for positioning with the connector 200. The first positioning recess is a cutout recess.

As shown in FIG. 1, the connector 200 is disposed adjacent to the housing 10 and electrically connects the board 70 and the outside of the motor 1. The connector 200 of the present example embodiment is disposed radially outside the housing 10, extends axially downward (in the downward direction), and accommodates the connector pin 81 that is a conductive member and that extends axially downward from the board 70 therein.

The upper face of the connector 200 is positioned below the heat sink upper face 101 of the heat sink 100, and the connector 200 and the board 70 overlap when viewed from the upper side in the axial direction.

Figure 7:
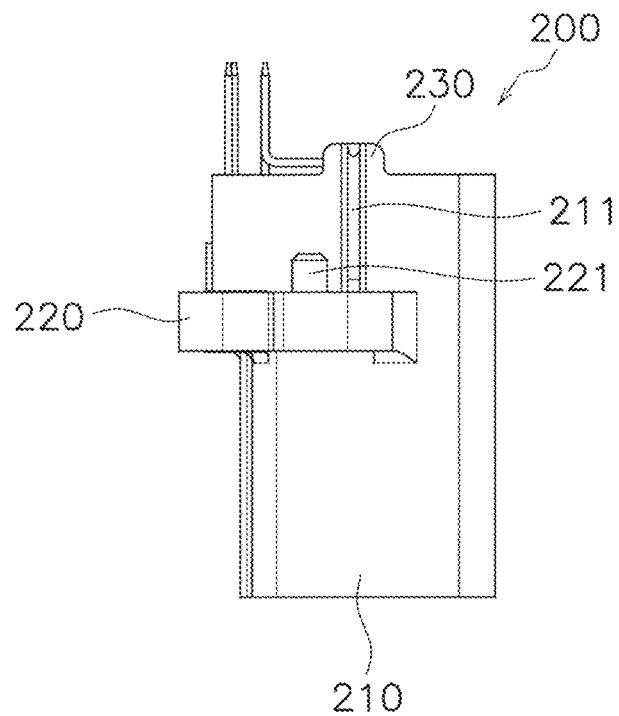
FIG. 7 is a side view of a connector according to the first example embodiment of the present disclosure.
Figure 8:
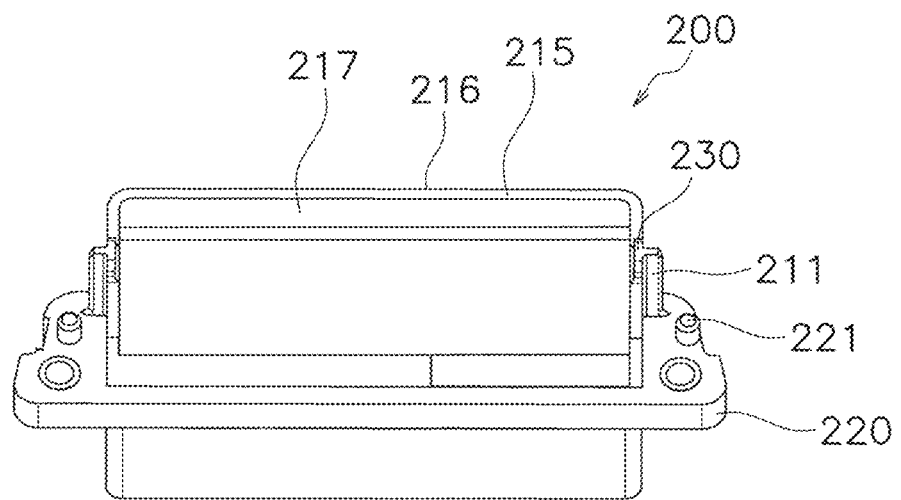
FIG. 8 is a perspective view of the connector according to the first example embodiment of the present disclosure.

As shown in FIGS. 7 and 8, the connector 200 includes a connector body 210 extending in the axial direction, a connector flange portion 220 extending radially outward from the outer face of the connector body 210, and a connector protrusion 230 extending axially upward from the upper face of the connector body 210.

Figure 9:
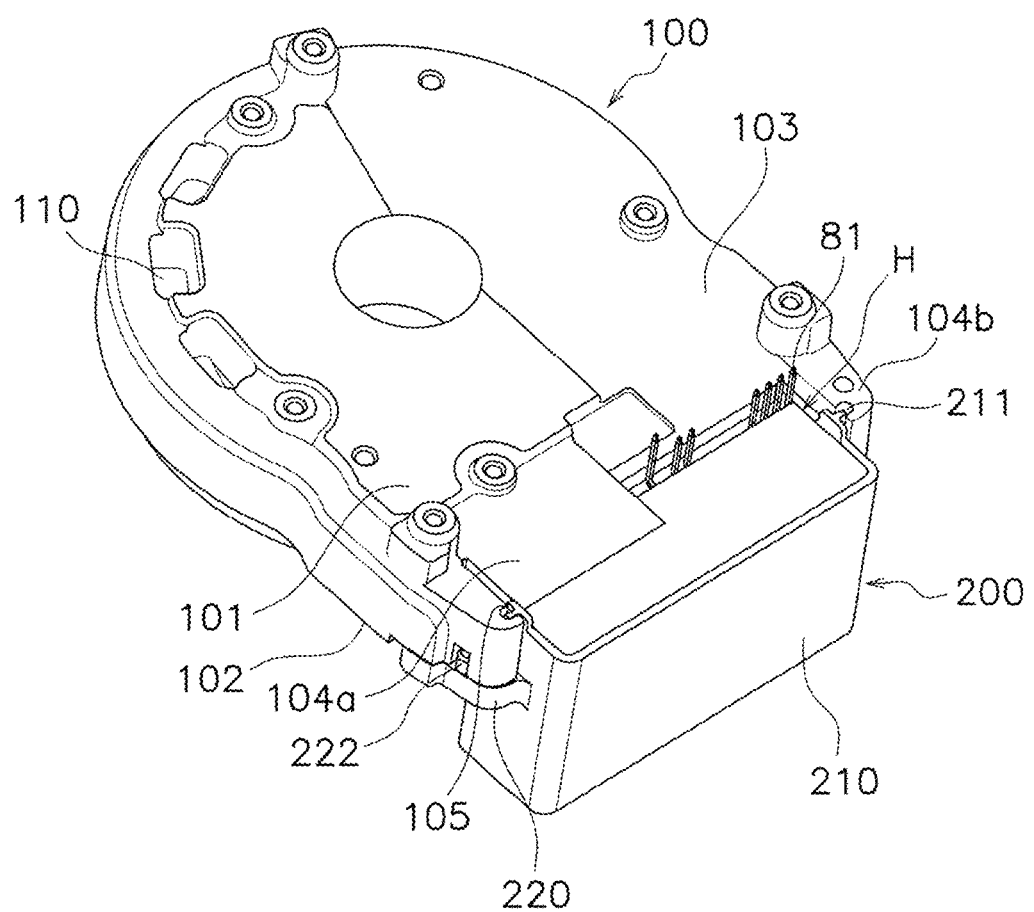
FIG. 9 is a perspective view of the heat sink and the connector according to the first example embodiment of the present disclosure.

As shown in FIG. 9, when the hollow portion H is formed with the heat sink main body 103 and the heat sink protrusion 104, at least part of the connector body 210 is positioned in the hollow portion H.

The connector body 210 is formed on the outer face and has a body projection 211 extending in the axial direction or a body recess (not shown). The body projection 211 extends in the axial direction from the connector flange portion 220 to the connector protrusion 230.

As shown in FIGS. 8, etc., the connector body 210 further includes a connector projection 215 formed in the radially outer end region and extending in the axial direction. The connector projection 215 is an outer edge portion including the connector outer end edge 216 on the radially outer side. The "connector outer end edge 216" is the outer end (the end of the connector 200).

The connector body 210 further has, radially inside of the connector projection 215, a pocket recess 217 formed by the radially inner face of the connector projection 215. The pocket recess 217 stores dust coming from the outside.

The connector flange portion 220 is formed in the central portion of the connector body 210 in the axial direction. The central portion is within a predetermined range from the center (for example, within one third of the center of the axial height). As a result, even when the connector 200 receives an external force, durability can be improved.

As shown in FIGS. 7 and 8, a fitting portion 221 for positioning with the heat sink 100 is formed on the upper face of the connector flange portion 220. The fitting portion 221 is fitted into each of the first positioning hole 178 and the first positioning recess 179 or the first positioning projection (not shown). The fitting portion 221 of the present example embodiment is a protuberance that extends upward.

The connector protrusion 230 extends upward from the upper face of the connector body 210. The connector protrusion 230 may be integrally formed with the connector body 210 or may be a separate member.

The connector projection 215 and the recess of the cover 30 are fitted via a gap. The connector 200 is substantially rectangular in plan view. The connector projection 215 and the recess of the cover 30 extend along the longitudinal direction of the connector 200.

Further, the connector protrusion 230 and a cover step 35 as shown in FIG. 1 are fitted via a gap. The corner portion on the radially outer side of the connector protrusion 230 and the step of the cover step 35 are fitted to face each other.

The motor 1 according to the present example embodiment has a labyrinth structure in which the cover 30 and the connector 200 are fitted to each other in a projection-recess shape through the gap. For this reason, while having a dustproof effect, a motor can be assembled easily.

As shown in FIG. 9, the connector 200 contacts the lower face of the second protrusion 104b. Specifically, the second protrusion 104b is disposed on the connector flange portion 220 such that a flange upper face 222 of the connector flange portion 220 and the heat sink lower face 102 of the second protrusion 104b contact each other. As shown in FIG. 3, when a plurality of second protrusions 104b is formed at intervals, the connector flange portion 220 contacts each of the lower faces of the plurality of second protrusions 104b.

The body projection 211 and the heat sink recess 105 are fitted via a gap. In addition, instead of the body projection 211, a body recess may be formed, instead of the heat sink recess, a heat sink projection may be formed, and the body recess and the heat sink projection may be configured to be fitted through a gap. As described above, when the connector 200 and the heat sink 100 are fitted to each other in a projection-recess shape through a gap, the assembly is easy.

The body projection or the body recess and the heat sink recess or the heat sink projection that are fitted to each other via a gap extend along the axial direction.

By fitting the fitting portion 221 of the connector to the first positioning hole 178 of the heat sink 100 (see FIGS. 3 and 4) and the first positioning recess 179 (see FIG. 4) or the first positioning projection (not shown), the heat sink 100 and the connector 200 are positioned. In the present example embodiment, a protuberance as the fitting portion 221 provided on the upper face of the connector flange portion 220, and a round hole as the first positioning hole 178 of the second protrusion 104b and a cutout recess as the first positioning recess 179 are fitted.

Note that the positioning between the heat sink 100 and the connector 200 may be fitted to each other, and the shape is not limited.

As shown in FIGS. 8 and 9, the connector 200 of the present example embodiment is a rectangular parallelepiped. For this reason, the connector 200 has a longitudinal direction and a lateral direction when viewed from above.

As shown in FIG. 9, the first protrusion 104a is positioned at one side of the connector 200 in the longitudinal direction and above the connector 200 in the height direction. The height direction is a direction orthogonal to the longitudinal direction and the lateral direction. In the present example embodiment, the height direction coincides with the axial direction. Specifically, the first protrusion 104a extends from one end toward the central portion in the longitudinal direction of the connector 200. In the longitudinal direction of the connector 200, the first protrusion 104a is not provided from the other side to the central portion. The first protrusion 104a is positioned at the upper end of the connector 200 in the height direction.

In the connector, the power supply signal circuit unit is disposed on one side where the first protrusion 104a is positioned on the upper side. In the connector, the control signal circuit unit is disposed on the other side where the first protrusion 104a is not positioned on the upper side. The first protrusion 104a extends linearly radially outward from the region where the power element is disposed in the heat sink main body 103.

As shown in FIG. 10, the connector pin 81 is accommodated in the connector 200. For this reason, the connector pin 81 has a connector connection portion 81C connected to the connector 200. The connector pins 81 are connected to the board 70. For this reason, the connector pin 81 has a board connection portion 81A connected to the board 70. In the radial direction, the positions of the board connection portion 81A and the connector connection portion 81C are different. In FIG. 10, the board connection portion 81A is positioned radially outside relative to the connector connection portion 81C.

The connector pin 81 includes a first axially extending portion 81a, a radially extending portion 81b, and a second axially extending portion 81c. The first axially extending portion 81a, the radially extending portion 81b, and the second axially extending portion 81c are located sequentially from the upper side in the axial direction.

The first axially extending portion 81a extends in the axial direction. The first axially extending portion 81a has the board connection portion 81A. The first axially extending portion 81a is positioned radially outside the first protrusion 104a of the heat sink protrusion 104. The first axially extending portion 81a is disposed with a clearance from the first protrusion 104a.

The radially extending portion 81b is continuous with the first axially extending portion 81a. The radially extending portion 81b extends in a direction intersecting with the axial direction. That is, the radially extending portion 81b extends in a direction different from a direction in which the first axially extending portion 81a extends. The direction intersecting with the axial direction may be a direction between the axial direction and the radial direction, or may be the radial direction. The radially extending portion 81b of the present example embodiment extends in the radial direction orthogonal to the axial direction. That is, it extends radially inward from the lower end of the first axially extending portion 81a. The first axially extending portion 81a and the radially extending portion 81b form substantially an L-shape.

The second axially extending portion 81c is continuous with the radially extending portion 81b and extends in the axial direction. The second axially extending portion 81c has the connector connection portion 81C. The radially extending portion 81b may have the connector connection portion 81C. The second axially extending portion 81c of the present example embodiment extends in the same direction as the first axially extending portion 81a. The second axially extending portion 81c and the radially extending portion 81b form substantially an L-shape.

In the structure shown in FIG. 10, from the radially outside toward the inside, the first axially extending portion 81a, the radially extending portion 81b, and the second axially extending portion 81c are positioned in this order. Specifically, the radially extending portion 81b extends radially inward from the lower end of the first axially extending portion 81a. A second axially extending portion 81c extends downward from the radially inner end of the radially extending portion 81b.

In the connector pin 81, the direction in which the first axially extending portion 81a extends and the direction in which the radially extending portion 81b extends intersect. For this reason, the connector pin 81 has a stress relaxation structure. The connector pin 81 may have two connecting portions extending in the intersecting direction as shown in FIG. 10, may have one, or may have three or more.

Note that the first axially extending portion 81a and the second axially extending portion 81c include a structure extending with an inclination at an angle of less than 45 degrees from the axial direction. Further, the radially extending portion 81b includes a structure extending with an inclination at an angle of less than 45 degrees from the radial direction.

The connector pin 81 is inserted into the connector 200 separately. That is, the connector pin 81 is outserted to the connector 200. Specifically, the connector pins 81 are not insert-molded integrally with the connector 200 but are outsert-molded. For this reason, there is a clearance between the portion, of the connector pin 81, inserted into the connector 200 and the connector 200. The connector pin 81 may be insert-molded in the connector 200.

As shown in FIG. 10, the connector pin 81 is positioned radially outside the first protrusion 104a of the heat sink protrusion 104. In the present example embodiment, the connector pin 81 is also positioned radially below the first protrusion 104a. Specifically, the first axially extending portion 81a is positioned radially outside the first protrusion 104a. The radially extending portion 81b is positioned radially below the first protrusion 104a.

Specifically, when viewed from axially below, the radially extending portion 81b overlaps the first protrusion 104a. In the present example embodiment, when viewed from axially below, the second axially extending portion 81c overlaps the first protrusion 104a.

When viewed from axially below, the upper face of the radially extending portion 81b is positioned below the lower face of the first protrusion 104a.

When viewed from the radially outside, the first protrusion 104a overlaps the connector pin 81. Specifically, when viewed from the radially outside, the first protrusion 104a and the first axially extending portion 81a overlap each other.

As mentioned above, in the present example embodiment, the structure as an example in which the cover 30 and the connector 200 are fixed to the heat sink 100 has been described, but the motor of the present disclosure may have a structure in which the heat sink and the connector are fixed to the cover. In the latter case, an easily assembled structure can be realized by adopting a structure in which the heat sink and the connector are fitted via a gap.

In the present example embodiment, the structure as an example in which the heat sink 100 also serves as a holder for holding the bearing 43 has been described, but the heat sink of the present disclosure may be separate from the bearing holder.

In the present example embodiment, the structure as an example in which the heat sink 100 also serves as a holder that holds the coil wire C that is inserted into the heat sink through hole 110 and the coil support member 60 has been described, but the holder for holding the coil wire and the coil support member may be separate from the heat sink of the present disclosure.

Next, the effects of the first example embodiment will be described. The motor 1 according to the first example embodiment of the present disclosure includes a rotor 40 including an axially extending shaft 41, a stator 50 surrounding a radially outer side of the rotor 40, a housing 10 accommodating the rotor 40 and the stator 50 therein, a heat sink 100 disposed axially above the stator 50, a board 70 fixed axially above the heat sink 100, a connector 200 disposed radially outside the housing 10, and a connector pin 81 accommodated in the connector 200 and electrically connected to the board 70, wherein the heat sink 100 includes a heat sink main body 103, and a first protrusion 104a which is continuous with the heat sink main body 103, the first protrusion 104a extending radially outward of the housing 10, the connector 200, the first protrusion 104a, and the board 70 overlap in this order when viewed from axially below, and the connector pin 81 is positioned radially outside the first protrusion 104a.

According to the motor 1 of the first example embodiment, with the connector pin 81 located radially outside, a space for installing the heat sink 100 is provided between the connector 200 and the board 70. Since the volume of the entire heat sink 100 can be increased by disposing the first protrusion 104a of the heat sink 100 in this space, the heat dissipation performance can be secured. Also, since this space is provided radially outside the housing 10, there is no need to make the housing 10 large in order to increase the volume of the heat sink 100. Therefore, it is possible to realize the motor 1 whose size is suppressed while the heat dissipation performance is ensured.

Preferably, the motor 1 of the first example embodiment further includes a choke coil 80a electrically connected to the board 70, and the connector 200, the first protrusion 104a, the board 70, and the choke coil 80a overlap in this order when viewed from axially below.

As a result, it is possible to dispose the choke coil 80a on the board 70 on the first protrusion 104a, and dispose other electronic components 80 on the board 70 on the heat sink main body 103. For this reason, a distance can be provided between the choke coil 80a that generates a relatively large amount of heat and the other electronic components 80. Therefore, heat generated from the electronic components 80 mounted on the board 70 can be efficiently released.

Preferably, in the motor 1 of the first example embodiment, a clearance is provided in the axial direction between the first protrusion 104a and the connector 200.

Since there is a clearance between the first protrusion 104a and the connector 200, a structure in which the lower face of the first protrusion 104a does not contact other members can be realized. For this reason, the heat dissipation effect of the first protrusion 104a can be improved.

Preferably, in the motor 1 of the first example embodiment, the connector pin 81 includes a board connection portion 81A connected to the board 70, and a connector connection portion 81C connected to the connector 200, and a position of the board connection portion 81A and a position of the connector connection portion 81C are different in the radial direction.

As a result, stresses due to an external force due to the connection of the connector 200 to the outside and a thermal shock can be mitigated from being applied to a connection portion with a board, such as a solder portion. Further, with this configuration, it is possible to easily provide a space for disposing the first protrusion 104a.

Preferably, in the motor 1 of the first example embodiment, the connector pin 81 includes a first axially extending portion 81a positioned radially outside the first protrusion 104a and extending in the axial direction, and a radially extending portion 81b extending radially inward from a lower end of the first axially extending portion 81a, and when viewed from axially below, the radially extending portion 81b overlaps the first protrusion 104a, and an upper face of the radially extending portion 81b is positioned below a lower face of the first protrusion 104a.

As a result, since the first protrusion 104a is positioned radially inward the first axially extending portion 81a, and axially above the radially extending portion 81b, the heat of the connector pins 81 can be efficiently released.

Preferably, in the motor 1 of the first example embodiment, the connector pin 81 is inserted separately into the connector 200.

As a result, it is possible to easily realize a structure in which the connector pin 81 is disposed radially outside the first protrusion 104a.

Preferably, in the motor 1 of the first example embodiment, the connector 200 is a rectangular parallelepiped, and the first protrusion 104a is positioned at one side of the connector 200 in a longitudinal direction and above the connector 200 in a height direction.

The connectors are classified into a power supply signal circuit unit and a control signal circuit unit, and the power supply signal circuit unit is provided on one side where the protrusion is positioned on the upper side, so that an efficient circuit design can be performed.

Figure 11:
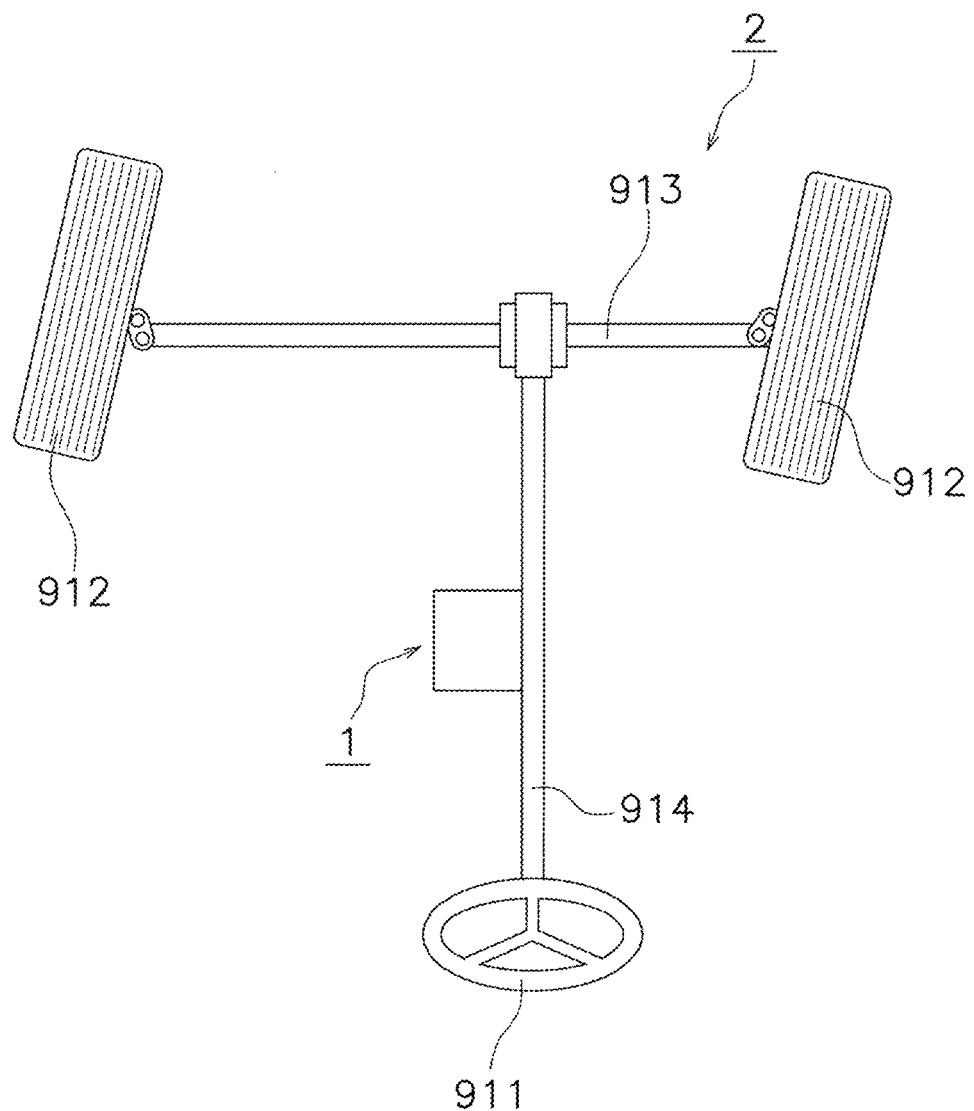
FIG. 11 is a schematic diagram of an electric power steering device according to a second example embodiment of the present disclosure.

With reference to FIG. 11, an example embodiment of an apparatus including the motor 1 of the first example embodiment will be described. In a second example embodiment, an example in which the motor 1 is mounted on an electric power steering device will be described.

An electric power steering device 2 is mounted on a steering mechanism for a vehicle wheel. The electric power steering device 2 of the present example embodiment is a column type power steering device that directly reduces the steering force by the power of the motor 1. The electric power steering device 2 includes the motor 1, a steering shaft 914, and an axle 913.

The steering shaft 914 transmits the input from a steering 911 to the axle 913 having wheels 912. The power of the motor 1 is transmitted to the axle 913 via a ball screw. The motor 1 employed in the column-type electric power steering device 2 is provided inside an engine room (not shown). In the case of the column-type power steering device, since a waterproof structure can be provided in the engine room itself, it is not necessary to provide a waterproof structure in the motor itself. On the other hand, although dust may enter the engine room, since the motor 1 has a dustproof structure, it is possible to suppress dust from entering the motor main body. The electric power steering device of the present disclosure is not limited to a column type, and may be a rack type or the like.

The electric power steering device 2 according to the second example embodiment includes the motor 1 according to the first example embodiment. For this reason, the electric power steering device 2 having the effect same as that of the first example embodiment can be obtained. That is, since the motor 1 according to the first example embodiment is provided, it is possible to suppress the size while ensuring the heat dissipation performance of the electric power steering device 2.

Here, although the electric power steering device 2 is given as an example of the usage method of the motor 1 of the first example embodiment, the method of using the motor 1 is not limited thereto, and it can be used for a wide range of devices such a pump and a compressor.

The example embodiments disclosed herein should be considered as an example in all points and not restrictive. The scope of the present disclosure is shown not by the example embodiments described above but by the claims, and it is intended that all modifications within the meaning and scope equivalent to the scope of the claims are included.

Features of the above-described preferred example embodiments and the modifications thereof may be combined appropriately as long as no conflict arises.

While preferred example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
 a rotor including an axially extending shaft;
 a stator surrounding a radially outer side of the rotor;
 a housing accommodating the rotor and the stator therein;
 a heat sink disposed axially above the stator;
 a board fixed axially above the heat sink;
 a connector radially outside the housing; and
 a connector pin accommodated in the connector and electrically connected to the board; wherein
 the heat sink includes a main body, and a protrusion which is continuous with the main body, the protrusion extending radially outward of the housing;
 the connector, the protrusion, and the board overlap in this order when viewed from axially below;
 the connector pin is positioned radially outside the protrusion;
 the board includes a first region in which a power element is mounted and a second region in which a control element is mounted;
 the first region and second region are located around the shaft and mutually separated circumferentially when viewed axially;
 the protrusion overlaps the first region when viewed axially;
 the connector in includes:
  a board connection portion connected to the board; and
  a connector connection portion connected to the connector;
 a position of the board connection portion and a position of the connector connection portion are different in a radial direction;
 the connector pin further includes:
  an axially extending portion positioned radially outside the protrusion and extending in the axial direction; and
  a radially extending portion extending radially inward from a lower end of the axially extending portion; and when viewed from axially below, the radially extending portion overlaps the protrusion, and an upper surface of the radially extending portion is positioned below a lower surface of the protrusion.

2. The motor according to claim 1, wherein a clearance is provided in an axial direction between the protrusion and the connector.

3. The motor according to claim 1, wherein the connector pin is inserted separately into the connector.

4. The motor according to claim 1, wherein
the connector is a rectangular or substantially rectangular parallelepiped; and
the protrusion is positioned at one side of the connector in a longitudinal direction and above the connector in a height direction.

5. An electric power steering device comprising the motor according to claim 1.

6. A motor comprising:
a rotor including an axially extending shaft;
a stator surrounding a radially outer side of the rotor;
a housing accommodating the rotor and the stator therein;
a heat sink disposed axially above the stator;
a board fixed axially above the heat sink;
a connector radially outside the housing;
a connector pin accommodated in the connector and electrically connected to the board; and
a choke coil electrically connected to the board; wherein
the heat sink includes a main body, and a protrusion which is continuous with the main body, the protrusion extending radially outward of the housing;
the connector, the protrusion, and the board overlap in this order when viewed from axially below;
the connector pin is positioned radially outside the protrusion; and
the connector, the protrusion, the board, and the choke coil overlap in this order when viewed from axially below.

7. The motor according to claim 6, wherein a clearance is provided in an axial direction between the protrusion and the connector.

8. The motor according to claim 6, wherein the connector pin includes:
a board connection portion connected to the board; and
a connector connection portion connected to the connector; and
a position of the board connection portion and a position of the connector connection portion are different in a radial direction.

9. The motor according to claim 8, wherein the connector pin includes:
an axially extending portion positioned radially outside the protrusion and extending in the axial direction; and
a radially extending portion extending radially inward from a lower end of the axially extending portion; and
when viewed from axially below, the radially extending portion overlaps the protrusion, and an upper surface of the radially extending portion is positioned below a lower surface of the protrusion.

10. The motor according to claim 6, wherein the connector pin is inserted separately into the connector.

11. The motor according to claim 6, wherein
the connector is a rectangular or substantially rectangular parallelepiped; and
the protrusion is positioned at one side of the connector in a longitudinal direction and above the connector in a height direction.

12. An electric power steering device comprising the motor according to claim 6.

* * * * *